United States Patent [19]

Luther et al.

[11] Patent Number: 4,863,149
[45] Date of Patent: Sep. 5, 1989

[54] FIXTURE FOR LOCATING ELEMENTS FOR ASSEMBLY

[75] Inventors: Thomas A. Luther, Matthew; Robert E. Ward, Jr.; Joel D. Galliher, both of Charlotte, all of N.C.; William J. Ryan, Muskego, Wis.

[73] Assignee: The Warner & Swasey Company, Cleveland, Ohio

[21] Appl. No.: 253,398

[22] Filed: Oct. 3, 1988

Related U.S. Application Data

[60] Continuation of Ser. No. 107,612, Oct. 13, 1987, abandoned, which is a division of Ser. No. 925,208, Oct. 31, 1986, Pat. No. 4,730,945.

[51] Int. Cl.$^4$ ............................................. B25B 11/02
[52] U.S. Cl. ........................................ 269/8; 29/281.1
[58] Field of Search ................ 29/244, 281.1, 281.5, 29/464, 466, 468; 156/275.7, 379.8; 228/47; 269/8, 309, 310

[56] References Cited

U.S. PATENT DOCUMENTS

| 3,142,174 | 7/1964 | Baker ..................... 269/8 X |
| 3,165,818 | 1/1965 | Soffa et al. ............... 29/464 X |
| 4,197,627 | 4/1980 | Hirabayashi et al. ......... 29/281.5 |
| 4,589,184 | 5/1986 | Asano et al. .............. 29/824 X |
| 4,616,411 | 10/1986 | Suzuki et al. ............. 29/822 |
| 4,726,103 | 2/1988 | Knight et al. ............. 29/281.5 |

FOREIGN PATENT DOCUMENTS

| 210865 | 6/1984 | Fed. Rep. of Germany ........ 29/244 |
| 192631 | 11/1983 | Japan ..................... 29/244 |
| 168614 | 5/1965 | U.S.S.R. .................. 269/8 |

Primary Examiner—P. W. Echols
Assistant Examiner—Andrew E. Rawlins
Attorney, Agent, or Firm—John R. Benefiel; Raymond J. Eifler

[57] ABSTRACT

A roller bearing installation, in which one or more roller bearing assemblies (30A, 30B, 30C) are prepackaged in a housing (18) having corresponding recesses (28A, 28B, 28C) receiving each bearing assembly (30A, 30B, 30C). An angled gib plate (52A, 52C, 52C) is bedded in each recess, each gib plate (52) including an inclined section (54) mating with an inclined surface (58) on a bearing assembly cover (72) to allow a bearing depth adjustment by lengthwise adjustment of the bearing assembly (30) in its recess, enabling position adjustment of the supported structure (10) and bearing preload adjustment. Accurate alignment of the bearing assembly (30) is achieved by a ball plunger (100) urging the same against a guide surface (57) of the gib plate (52). A fixture (110) is used to precisely locate each gib plate (52A, 52B, 52C) in a recess (28) while a moldable bonding material (109) in which each gib plate (52) is bedded sets up. Electromagnetic coils (146, 148) are used to releasably hold each gib plate (52) on a respective locator arm (134, 136) during the process.

4 Claims, 6 Drawing Sheets

FIXTURE FOR LOCATING ELEMENTS FOR ASSEMBLY

This application is a continuation of application Ser. No. 107,612 filed Oct. 13, 1987, now abandoned, which is a division of application Ser. No. 925,208, filed 10/31/86, now U.S. Pat. No. 4,730,945.

FIELD OF THE INVENTION

This invention concerns installation of way bearings as are used in supporting machine tool structures for linear motion on way surfaces, and more particularly installations of way bearings of the recirculating roller type.

BACKGROUND DISCUSSION

In machine tools and other similar machines and apparatus it is often necessary to support relatively heavy structural components for precision movement along way surfaces.

The accuracy of machining depends on the accuracy of the motion of such components along their respective axis.

Simple plain bearings, used for many years, have more recently been replaced by various linear roller bearings in order to reduce friction. A successfull version of such bearings is the so called recirculating roller bearing in which a series of roller elements move about a circulation path accurately ground into the periphery of a track member, with a surrounding and enclosing bearing cover confining the rollers in their recirculation path. The roller elements are exposed on one side of the bearing assembly such as to enable rolling movement along a way surface with the supported structure dismounted to the bearing cover.

In order to achieve the accurate linear motion, the axis of the bearing assembly must be precisely aligned with the desired direction of motion of the supported structure, and this also prevents skewing forces tending to reduce bearing life.

In U.S. Pat. No. 4,544,211 entitled "RECIRCULATING BEARING ASSEMBLY" issued on Oct. 1, 1985, there is disclosed an improved recirculating roller bearing in which skewing forces are minimized in the bearing assembly.

Two sets of roller elements each circulate about the track member on either side of a central divider.

Installation of such bearing assembly in the supported structure typically involves precision machining of locating surfaces in order to properly align the bearing assembly within the supporting structure.

There is oftentime a need to provide adjustability of the bearing depth and in such instances a gib wedge plate package is provided in which a pair of plates having matching inclined surfaces are adjusted lengthwise relative to each other in order to provide a adjustment of the depth of the installed bearing assembly.

Such bearing assemblies are typically installed in sets, each comprised of a number of variously facing bearings such as to engage a series of surfaces on the supporting structure, such as above and below a way surface and along a lateral edge. In such instances it is usual to provide such bearing adjustment for enabling precision adjustment of a supported structure and also for establishing a proper bearing preload by adjusting an opposing bearing assembly for reasons well known to those skilled in the art.

In such installations, considerable precision machining of the supported structure is necessitated which is difficult and expensive to accomplish on the usually relatively massive supported structures. Typically, as on a table, saddle, column, or similar structure, four sets of bearing assemblies are necessitated, one at each corner of the table.

Additionally, assembling the supported member carrying the bearing sets onto the supporting ways is a difficult operation.

Such recirculatng bearing assembies need to be lubricated in use and such installations necessitate additional machining and assembly labor to direct lubrication passages to each of the bearings in each set also adding to the manufacturing cost.

As noted, it has heretofore been known to provide an adjustment in such bearing assembies by means of a pair of gib plates which are inclined and mate with each other disposed atop the bearing assembly such that lengthwise adjustment therebetween produces a height adjustment in the bearing assembly.

This arrangement typically includes a central slider or keyway with a key to maintain the perfect alignment of the bearing axis during the height adjustment.

It is also known to simply use a shim disposed above the bearing assembly in the housing. This likewise requires precision machining of the supported structure to fit the gib plate assembly into the supporting structure and the bearing assembly housing.

In order to simplify the assembly of the bearing housing onto the ways, separate bolted on sections are utilized, each having to be separately machined and precision aligned with the remaining structure.

U.S. Pat. No. 4,486,054 issued on Dec. 4, 1984 for a "RECIRCULATING ROLLING BEARING" disclosed an adjustable roller bearing assembly in which a cylindrical bearing housing is slidably fit into a bore slightly inclined to the bearing to enable a height adjustment. This requires a precision machined bore.

DESCRIPTION OF THE INVENTION

The present invention is an improved installation for a roller bearing assembly comprising a housing structure formed with a recess configured to receive the bearing assembly and with the bearing assembly cover member formed with an inclined upper surface, which mates with an inclined surface formed on a section of an angled gib plate fixed within the recess. The angled gib plate is also formed with a straight guide section.

The housing is installed in the recess urged against the guide section to precisely align the axis of the bearing throughout a lengthwise position adjustment of the bearing assembly, executed in order to produce a depth adjustment of the bearing assembly by mating of the inclined surfaces of the bearing cover and gib plate inclined section.

The angled gib plate is preferably secured in the recess in a fixed predetermined position by means of a moldable bonding material applied while holding the gib plate in position in a suitable fixture during installation of the gib plate into the recess.

The bearing assembly upon being installed against the gib plate is propertly aligned within the bearing structure and remains precisely aligned throughout the range of adjustment available.

The adjustment is carried out by means of a threaded adjustment element passing through a side of the recess and threadably engaging the bearing assembly cover with a locking element also provided to secure the bearing assembly in any adjusted position.

A mating pair of dished washers are preferably employed to accomodate slight changes in alignment of the adjustment threaded element which occur as the adjustments are carried out.

The installation is advantageously applicable to a plurality of prepackaged bearing assemblies, each mounted within a respective recess of a common C-shaped cast bearing housing. Each recess opens inwardly about each leg of the C-shape such as to be able to be fit around a suitable supporting way structure with the adjustment element received within a cast-in web defining in part each recess or pocket.

The housing structure is premachined with suitable lubrication passages directed to eac recess and passing within passages extending through the bearing cover to the space wherein the roller elements circulate.

The housing structure carrying the plurality of bearing assemblies is installed as a unit onto the structure to be supported such that the individual bearing assemblies and thereafter the bearing height adjustment carried out. Accordingly, each bearing assembly is not required to be precisely mounted to the supported structure, greatly simplifying the installation thereon.

The present invention offers the advantage of greatly reduced assembly and machining effort required in installation of individual bearing assemblies and eliminating the need for extensive machining of the supported structure.

According to one aspect of the present invention a particular fixture is employed in order to position the gib plates within the respective housing structure recesses so as to be subsequently secured in position by means of applying a high strength moldable bonding material such as a metal reinforced epoxy resin, which holds the gib plates secure in the accurately predetermined positions after setting up the bonding material.

The fixture comprises one or more locating arm members each having an end face adapted positionable such that with the gib plate held thereagainst each gib plate is precisely located in the housing structure. Each gib plate holding means preferrably is an electromagnetic coil when energized securely but releasably attracting the angled gib plate firmly against the end face of the locator arm. One or more of the locator arms may be movable on a carrier slide, in turn movable into the housing to subsequently enable positioning each of the plurality of arms within a respective recess.

DETAILED DESCRIPTION

Figure 1:
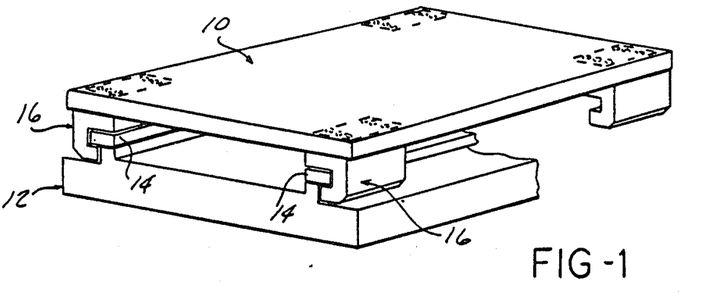
FIG. 1 is a perspective view of supported and supporting machine structures mounted together by roller bearing installations according to the present invention.

FIG. 1 illustrates a typical application of the bearing installation according to the present invention in which a rectangular table or saddle 10 comprising the supported structure is mounted for linear motion on a supporting structure 12 comprised of spaced parallel ways 14 extending beneath the table 10.

A bearing installation 16 is located at each corner of the table 10 affixed beneath the table 10 and the open side of the C-shaped housing of each bearing installation receiving the parallel ways 14.

Figure 2:
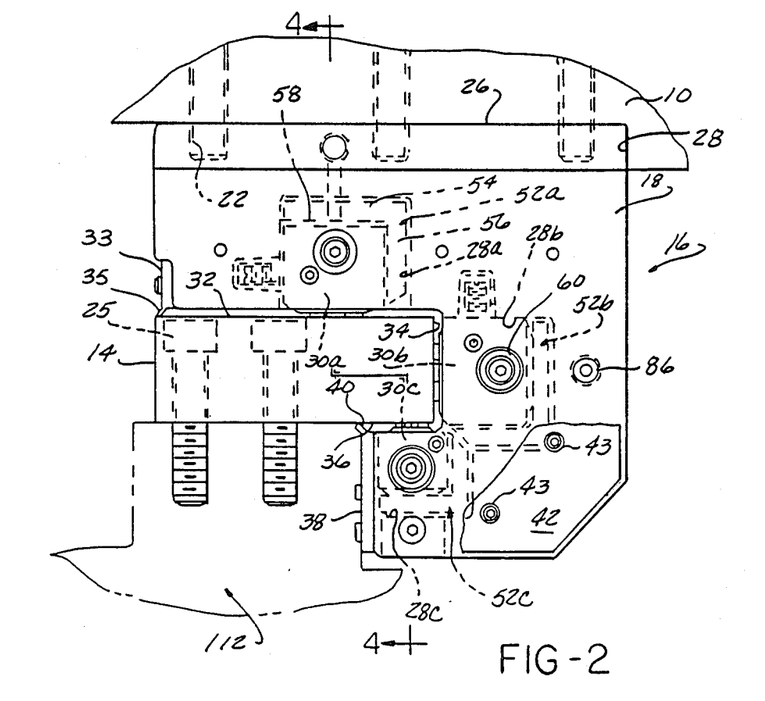
FIG. 2 is an enlarged endwise view of a roller bearing installation according to the present invention with portions of the supported and supporting machine structure shown in phantom fragmentary portions.

FIG. 2 shows the details of each bearing installation 16 which includes a generally C-shaped housing structure 18 affixed beneath the table 10 and having a flange portion 20 having a number of tapped bores 22 receiving fastening cap screws 25 extending through the table 10. The top and side surfaces 26 mate with corresponding machined surfaces on the table 10 to provide accurate location of the housing structure 18. Alternatively, doweling or other methods of accurately locating the housing structure 18 on the table 10 may be employed.

The housing structure 18 is preferably of cast iron construction and includes a series of recesses 28 formed by casts in pockets, each arrayed about each side of the C-shape, facing inwardly towards a way 14. Installed in each recess 28 is a respective bearing assembly 30A, 30B, and 30C, with two of the bearing assemblies, 30A and 30C, being in opposing relationship, such as to be able to exert a preloading pressure on the upper and under surfaces of bearing way 14. The ways 14 are mounted to the table supporting structure by means of cap screws 25, as shown.

A series of wipers are provided preventing entrance of foreign matter and confining the lubricant supplied through passages to be described hereinafter on the way surfaces 32, 34, and 36 respectively. These wipers includes an upper side wiper 33 fastened along the upper lateral edge of the housing 18, including a wiping lip 35. A lower lateral wiper 38 is secured with screws as shown to the lower side faceof the housing 18 having a wiping lip 40 engaging the under surface 36 of way 14.

Front and rear covers 42 and 44 are also provided (see FIG. 4) provided with upper and lower wiper lips 44 and 46 at the front and upper and lower wiper lips 48 and 50 at the rear to wipe the surfaces 32 and 36.

Angled gib plates 52A, 52B, and 52C are precisely located within a respective recess 28A, 28B or 28C and firmly secured in the predetermined position.

Angled gib plate 52A, 52B and 52C are each comprised of an inclined section 54 and a coextensive straight-sided guiding section 56. The surface 55 (FIGS. 4, 5) of the inclined section 55 is in engagement with a complementary inclined surface 58 formed atop each bearing assembly 30.

Figure 3:
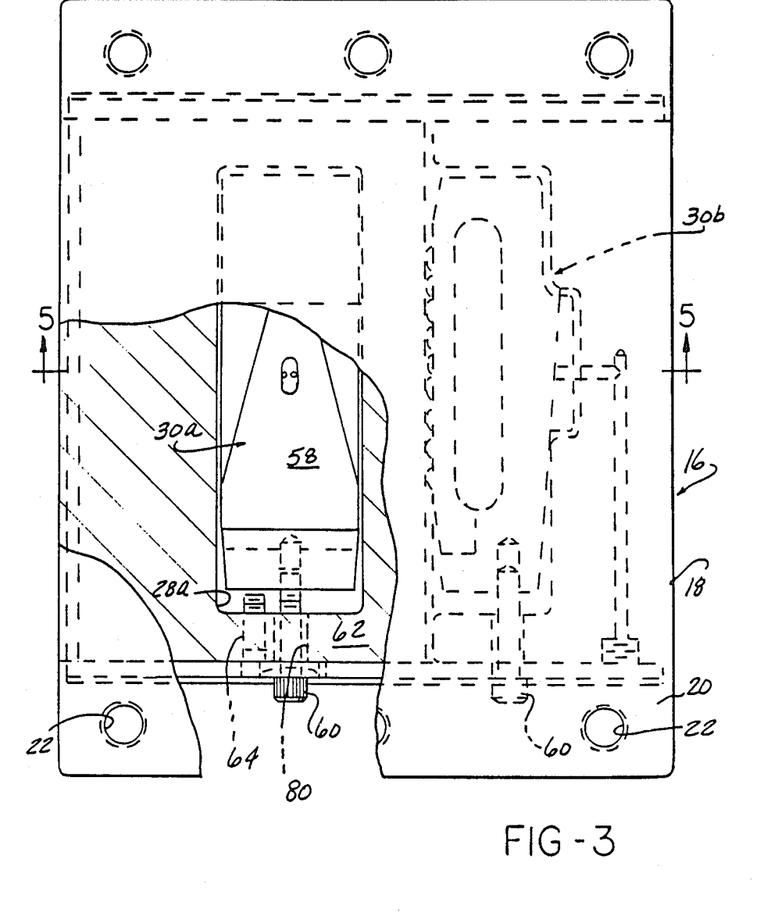
FIG. 3 is a fragmentary plan view of the roller bearing installation shown in FIG. 2 showing in section portions of the housing structure component adjacent one of the bearing assemblies incorporated in the installation.

FIG. 3 illustrates the means provided for establishing a lengthwise position adjustment of each bearing assembly 30 and a corresponding recess 28, such that a depth (or height) adjustment may be achieved by engagement of the inclined surface 58 with the inclined surface of gib plate section 54. Such means is constituted by an elongated thread element i.e., a cap screw 60, passing through a web 62 defining in part each recess 28, through a bore 80 formed in web 62, with a suitable sufficient clearance provided therebetween to accomodate the sight tilting that occurs as the lengthwise position adjustment is executed.

Each cap screw 60 is threadably engaged with a bearing cover component 72. The cap screw 60 is seated against a pair of dished washers 78 turn abutting the web 62 such as to prevent the capscrew 60 from moving to the right as viewed in FIG. 4, capturing it to cause the lengthwise movement of the bearing assembly 30 upon rotation thereof.

The consequence of the lengthwise adjustment of the bearing assembly position is an adjustment of the depth (or height) of the bearing assembly 30 by virtue of the engagement of the surface 58 with the inclined surface 55 of the gib plate section 54.

A locking element constituted by Allen screw 64 threadably received in a bore in the web 62 is engagable against the end face of the associated bearing assembly 30 to secure an adjusted position of the bearing assembly 30 when tightened thereagainst.

Figure 4:
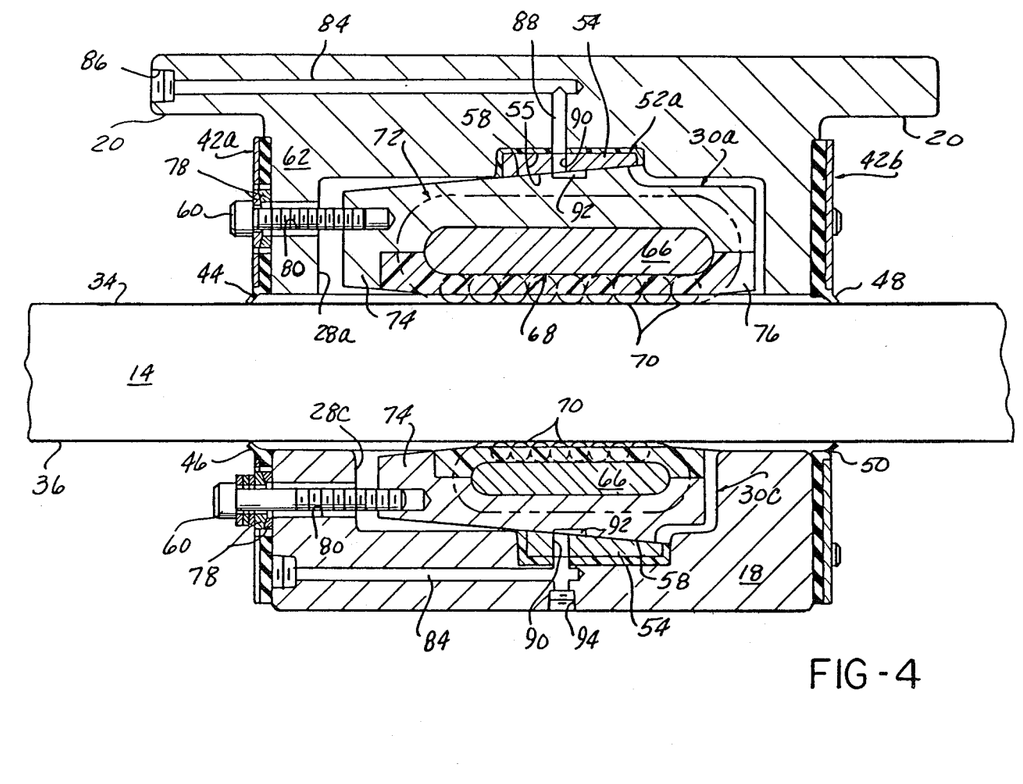
FIG. 4 is a view of a lengthwise section taken in FIG. 2.

FIG. 4 illustrates the construction of each bearing assembly 30 as typified by the bearing assemblies 30A and 30C shown, which comprises a track member 66 having a peripheral surface 68 providing a circulation bearing path for a plurality of roller elements 70.

The construction of each of the bearings 30 is preferably according to the aforementioned U.S. Pat. No. 4,544,211, due to its superior tracking ability under heavy loads.

The roller elements 70 are confined so as to circulate about the surface 68 of the track member 66 by a two-piece cover 72 allowing the protrusion of the roller elements 70 on one side of the bearing such as to enable rolling contact with the surface 34 of the way 14 as shown in FIG. 4.

The bearing cover 72 includes an upper member 74 formed with the inclined surface 58 which threadably receives the cap screw 60 for lengthwise position adjustment of the bearing assembly 30A as a whole.

The lower portion 76 of the cover 72 may be constructed of molded plastic secured together by means of suitable fasteners as detailed in the aforementioned U.S. patent.

The cap screws 60 are restrained by means of a dished washer pair 78 which accomodates slight tilting of the capscrew 60 as the inclined surface 58 is drawn against the surface of the inclined section 54 of the gib plate 52.

A suitable clearance between bore 80 in web 62 and the capscrew 60 accomodates the slight tilting of the capscrew 60.

Lubricant passages are formed in the housing structure 18 including a passage 84 exiting in a threaded fitting bore 86 which communicates with a cross passage 88 aligned with openings 90 in the gib plate section 54 communicating with a recess 92. A bearing cover 74 associated with the lower bearing 30C has similar lubricant passages 84, 90, and recess 92 machined through a plugged port 94.

Figure 5:
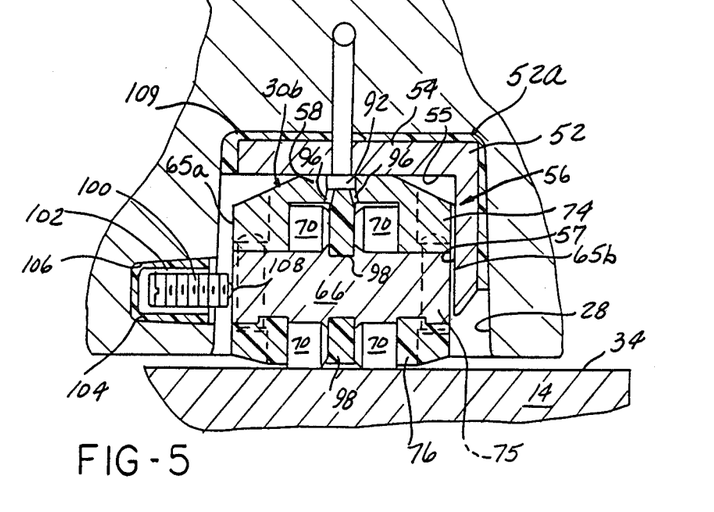
FIG. 5 is a view of a transverse section taken in FIG. 3 showing a portion of the supporting machine structure with the bearing engagement thereon.

FIG. 5 illustrates that recess 92 communicates with drilled passages 96 communicating with the space in which roller elements 70 pass to direct a flow of lubricant to the surfaces subject to rolling contact within the bearing 30, as also seen in FIG. 5.

The rolling elements 70 according to the aformentioned design described in U.S. Pat. No. 4,554,211, comprised of two different sets of roller elements 70 separated by a spacer 98.

FIG. 5 also illustrates the construction of the gib plate 52, including the inclined section 54 and the guide section 56. The bearing assembly 30A is urged sideways against the inside surface 57 of the guide section 56 in order to align the bearing assembly 30A along the bearing axis within the housing 18.

This urging is established by means as may be constituted by a spring loaded plunger assembly 100 disposed in a threaded socket 102 and turn bedded by means of a mass of bonding material 104 in a bore 106 formed in the housing 18.

A ball portion 108 acts on a lateral surface 65a of the track member 66 to urge an opposite surface 65b thereof against surface 57 of the guide section 56.

The gib plate assembly 52A is securely located in a precisely predetermined position within a recess 28 by means of a mass of moldable bonding material 109 occupying a clearance space between a gib 52A and a recess 28.

The moldable bonding material must be of sufficient rigidity and durablity to rigidly locate the gib plate 52A therein while absorbing the loads to be encountered.

A suitable material is a metal reinforced epoxy resin which is commercially available and well known to those skilled in the art.

Figure 6:
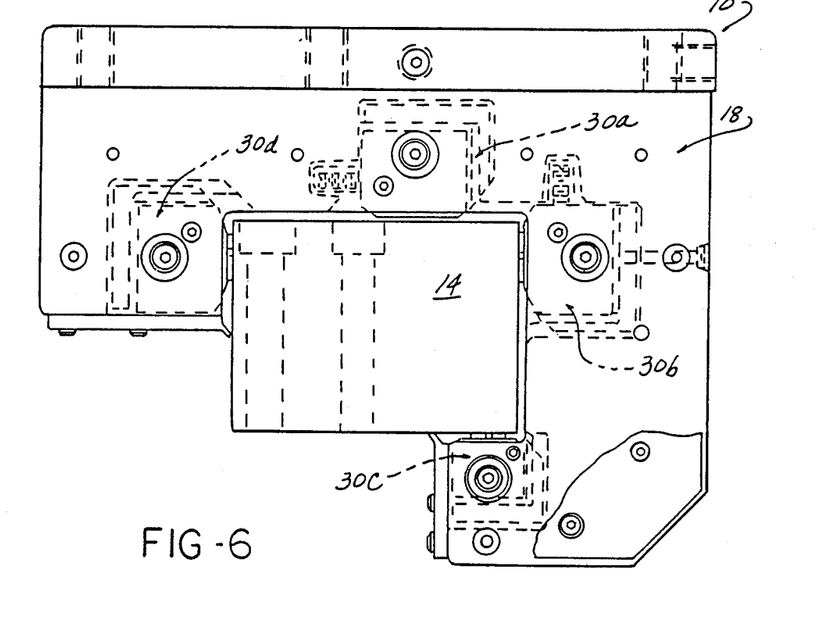
FIG. 6 illustrates an alternate embodiment of the bearing installation according to the present invention in end view.

FIG. 6 shows that the bearing housing 18 may also be configured to accomodate a fourth bearing set, in which an additional bearing 30D is provided in a downwardly pendent section of the housing 18 so as to engage the way 14 on lateral as well as opposite upper and lower side surfaces thereof. This arrangement allows position adjustment of the supported structure in the horizontal plane.

In such application the opposite array 16 on the other side of the table structure would omit the laterally spaced bearing assemblies 30B and 30D and provide accurate lateral location of the bearing assembly by virtue of being guided on one of the rails 14.

Figure 7:
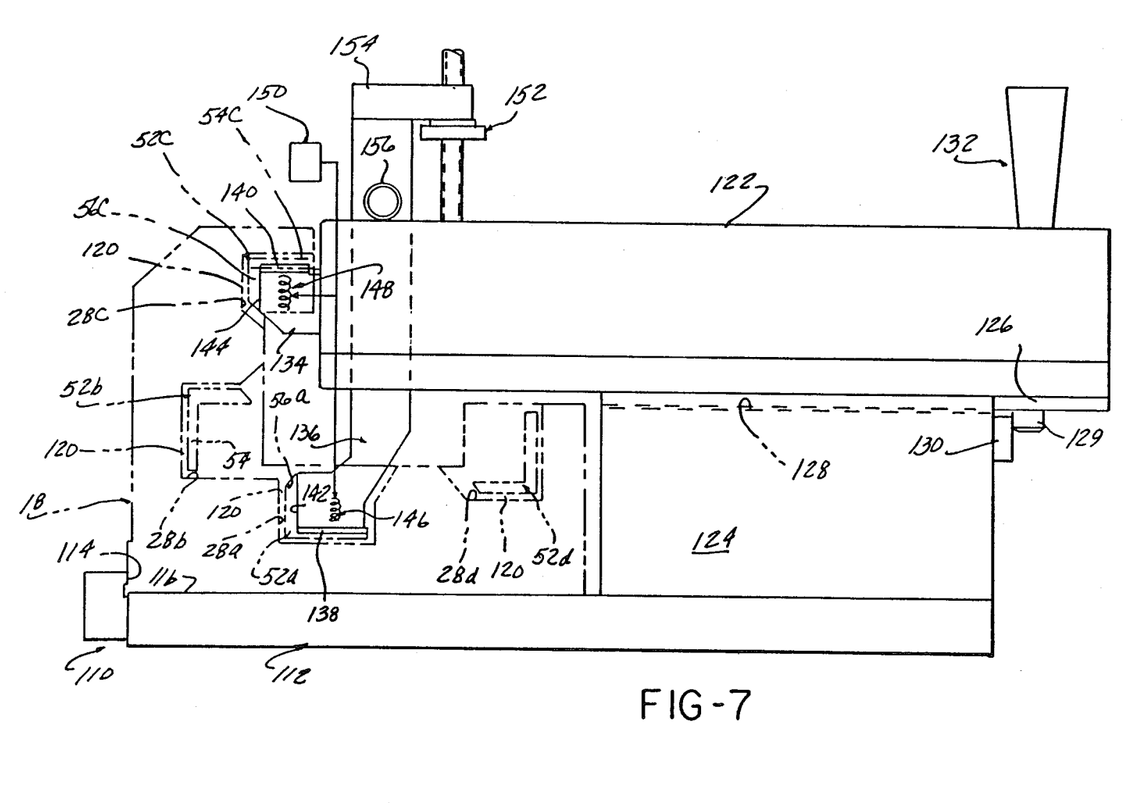
FIG. 7 shows a side elevational view of the locating fixture utilized in constructing the bearing installation according to the present invention, depicting the installation of the vertically opposed set of gib plates.
Figure 8:
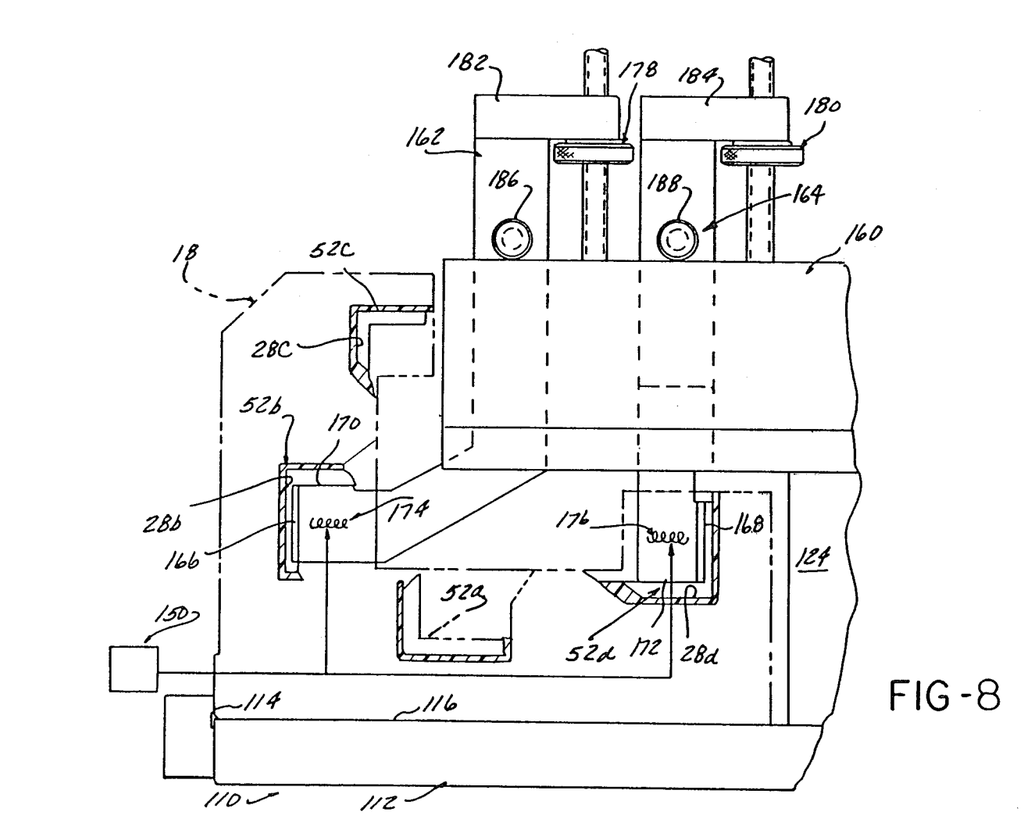
FIG. 8 is a fragmentary enlarged view of the fixture shown in FIG. 7 depicting the installation of the horizontally opposed set of gib plates.

FIGS. 7 and 8 show the use of the locating fixture used in making the installation according to the present invention, illustrated in making the bearing installation of FIG. 6.

The locating fixture 110 includes a fixture platform 112 having suitable locating surface features 114, to allow accurate positioning of the housing structure 18 according to the present invention, shown in phantom on the upper surface 116 of the fixture 112.

Each recess 28a, 28b, 28d is configured so as to receive a corresponding gib plate 52a, 52b, 52c, and 52d (also shown in phantom) in the proper location with a clearance space 120 therebetween, as indicated.

For the four bearing installation, a two stage process is employed, with vertically opposed sets of gib plates 52A and 52C assembled in a separate step from horizontally opposed sets of gib plates 52B and 52D.

A first carrier slide 122 is mounted on a pedestal block 124 fixed atop plate 112 for lengthwise sliding motion. A key 126 interfit with a keyway 128 maintains precise alignment, with a locating pin 129 moving against a locator block 130 at the correct operating position of the carrier slide 122. A handle 132 may be provided to enablemanual movement of the carrier slide 122 into position.

A pair of locator arms 134, 136 are provided for respective gib plates 52A and 52C, a first locator arm 134 fixed to the forward end of carrier slide 122, and a second locator arm 136 vertically slidable in the carrier slide 122. Each locator arm 134 and 136 has formed on the end thereof an angled end surface 138 and 140 respectively, exactly corresponding to the inclined sections 54A, 54C of the gib plates 52A and 52C respectively; and also a side surface 142 and 144 corresponding to the guide sectins 56A and 56C thereof.

An electromagnet 146 and 148 is mounted in each locator arm 134 and 136 adjacent the end thereof, adapted to be selectively energized from a suitable power supply circuit 150, to securely hold a respective gib plate 56A and 56C against surfaces 138, 140, 142, 144.

The locator arm 136 is slidably mounted to be able to be elevated as the carrier slide 122 is moved into the housing structure 18, so as to clear the otherwise interfering portions of the housing. Afterwards, the locator arm 136 is lowered, as by a rotation of a threaded thumbscrew 152 mounted in offset plate 154 affixed to the upper end of the locator arm 136 until a locator pin 156 comes to rest atop the carrier slide 122, which is precisely located to very accurately position the surface 138.

In practice, the housing structure 18 is positioned on surface 116 against the locating surfaces 114. Metallic epoxy resin is applied in each recess 28A and 28C.

Gib plates 52A and 52C are positioned against surfaces 138, 140, 142, 144 and the electromagnets 146, 148 energized.

The carrier slide is advanced to move the gib plate 52C into position in recess 28C, embedded in the mass of bonding material. Thereafter, locator arm 136 is lowered to move gib plate 52A into position in recess 28A, also embedded into the mass of bonding material.

The bonding material is allowed to set up, and thereafter the electromagnets are deenerigized to release the gib plates 52A and 52C and allow withdrawal of the locator arms 134, 136.

FIG. 8 shows that a second carrier slide 160 is employed for the second stage, which also carries a pair of locator arms 162, 164, both slidable vertically in the carrier slide 160. Each locator arm 162, 164 is adapted to hold and position a respective gib plate 52B, 52D in similar fashion to the above described locator arms 134, 136, and thus are formed with respective inclined surfaces 166 and 168, and surfaces 170 and 172, adapted to receive sections 54 and 56 of the gib plates 52B, 52D.

Electromagnet coils 174, 176 are provided adjacent to these surfaces, selectively energized by power supply circuit 150 to create a magnetic holding force when energized to securely hold the respective gib plates 52B, 52D in position thereon.

Each locator arm 162, 164 is also likewise provided with thumbscrews 178 and 180 respectively mounted in offset plates 182 and 184 respectively fixed atop each locator arm 162, 164 to allow lowering onto a locator pin 186, 188 after carrier slide 160 is moved into position.

As before, a moldable bonding material, preferably a metallic epoxy resin, is emplaced in the recesses 28B, 28D prior to moving the gib plates 52B, 52D thereinto, magnetically clamped to the ends of the locator arms 162, 164.

After the epoxy has set, the electromagnetic coils 174, 176 are deenergized to release the gib plates 52B, 52C and allow withdrawal of the locator arms 162, 164 and carrier slide 160.

It can be appreciated that very accurate location of all of the inclined and guiding surfaces are thereby achieved very expeditiously, as compared to conventional machining processes.

The bearing installation may be mounted as an assembly by accurate location of the housing as a whole on the table, with the beaings each adjusted to establish a position adjustment of the supported structure and thereafter proper bearing preload by adjustment of the opposing bearing assembly.

Maintenance is greatly simplified, since individual bearings can be replaced without dissassembly or reworking of the major machine structural components.

We claim:
1. A fixture (110) for locating a plurality of elements (52) in predetermined respective locations and positions in a structure (18) for assembly therein, comprising;
   a fixture frame (112);
   at least one locating feature (114) in said fixture frame (112) adapted to abut a portion of said structure (18) to locate said structure (18) in said fixture frame (112);
   a plurality of locator arms (162, 164) each having an end face (170, 172) adapted to receive and positively locate an element (52) thereagainst; a carriage (160) mounted on said fixture frame (112) for linear movement along a predetermined direction, said plurality of arms (162, 164) mounted on said carriage (160) for movement therewith, at least one of said arms (162) movably mounted on said carriage (160) and movable transverse to the direction of movement of said carriage (160); arm locator means (186, 188,) precisely and positively locating said at least one arm (162) in an advanced position on said carriage (160) and carriage locator means (129, 130) locating said carriage (160) on said fixture frame (112) in an advanced position thereon so as to locate each element (52) in said predetermined respective positions when said at least one arm (162) and said carriage (160) are in said advanced positions;
   holding means (174, 176) selectively establishing an attractive holding force between an element (52) and a respective end face (170, 172) so as to temporarily hold a plurality of elements (52) in said respective positions in said fixture frame (112), and thereafter released after assembling said elements (52) in said structure (18).

2. The fixture (110) according to claim 1 wherein said holding means (174, 176) comprises electromagnetic means.

3. The fixture (110) according to claim 1 wherein said locator means (186, 129) includes a fixed stop (186) against which said at least one arm (162) moves, and a fixed stop (129) locating said carriage (160) in said fixture frame (112).

4. The fixture (110) according to claim 3 wherein each of said plurality of arms (162, 164) are mounted parallel to the other and movable to advanced positions on said carriage (160), and said arm locator means includes means (186, 188) precisely and positively locating each of said arms (162, 164) in said advanced position on said carriage (160) to position a respective element (52) in said structure (18).

* * * * *